(12) United States Patent
Hikmet (10) Patent No.: US 6,432,576 B1
(45) Date of Patent: Aug. 13, 2002

(54) LITHIUM SECONDARY BATTERY

(75) Inventor: Rifat A. M. Hikmet, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/352,314

(22) Filed: Jul. 12, 1999

(30) Foreign Application Priority Data

Jul. 16, 1998 (EP) .............................................. 98202387

(51) Int. Cl.[7] .............................. H01M 2/00; H01M 2/18
(52) U.S. Cl. ........................ 429/162; 429/237; 429/127
(58) Field of Search ................................. 429/233–237, 429/162, 152, 127; 29/623.3, 623.4

(56) References Cited

U.S. PATENT DOCUMENTS 5,019,468 A * 5/1991 Miyabayashi ............... 429/191
5,518,836 A 5/1996 McCullough ................ 429/94
6,103,417 A * 8/2000 Rapeli ......................... 429/145

FOREIGN PATENT DOCUMENTS

| EP | 0893838 A1 | 1/1999 | .......... H01M/10/12 |
| JP | 59148280 | 8/1984 | ............ H01M/6/46 |

* cited by examiner

Primary Examiner—Carol Chaney
(74) Attorney, Agent, or Firm—Ernestine C. Bartlett (57) ABSTRACT

A description is given of a thin flexible lithium-ion battery and of methods of the manufacture thereof. According to one of the methods, a negative electrode, a separator, and a positive electrode are provided with a pattern of macroscopic holes. After aligning the holes, the stack of the electrodes and the separator is placed on a structured polymer film having piles in the same pattern as the holes. After applying heat and pressure, the ends of the piles are flattened, and form a kind of rivets by which the electrodes and the separator are bonded together. This bonding ensures a good contact between the electrodes and an electrolyte in the separator.

11 Claims, 4 Drawing Sheets

LITHIUM SECONDARY BATTERY

BACKGROUND OF THE INVENTION

1. Field of the Invention

The invention relates to a lithium secondary battery comprising a stack of:
- a negative electrode having negative electrode material and a negative current collector;
- a positive electrode having positive electrode material and a positive current collector;
- a separator sandwiched between the negative and the positive electrode;
- a non-aqueous electrolyte solution between the negative and the positive electrode The invention also relates to a method of manufacturing a lithium secondary battery comprising a stack of a negative electrode, a separator, and a positive electrode, which method comprises applying negative electrode material onto a negative current collector so as to form the negative electrode, applying positive electrode material onto a positive current collector so as to form the positive electrode, and arranging a separator between the negative and the positive electrode so as to be contiguous therewith.

2. Background Art

The need for high-energy density secondary (i.e. rechargeable) batteries is increasing, due to a growing market for lightweight, portable cordless consumer products, e.g. CD-players, mobile telephones, laptop computers and video cameras. For acceptable portability, these batteries should contain the necessary amount of energy at the smallest possible weight and volume. The present rechargeable batteries on the market, e.g. nickel-cadmium (NiCd) and nickel-metalhydride (NiMH), do not meet all these requirements. Moreover, the use of cadmium as the negative electrode material should be avoided for environmental reasons.

A very interesting material for use in batteries is lithium. Lithium is the lightest of all metals, which promises an extremely high theoretical energy density of metallic lithium. Lithium is a leading contender in the field of a battery negative electrode materials, since it has a large negative thermodynamic potential. The use of lithium has no negative environmental consequences. Therefore, rechargeable lithium batteries are very promising, especially when weight is an important factor.

A rechargeable lithium battery consists of a positive and a negative electrode separated by a polymeric film to prevent electronic contact in an organic electrolyte. A lithium transition metal oxide can be used as the positive electrode, and metallic lithium as the negative electrode. The electrolyte is a lithium salt in a non-aqueous organic solvent with good ionic conductivity and negligible electric conductivity. During charging, lithium ions are transported from the positive electrode towards the negative (lithium) electrode. During discharging the lithium ions are transported in the reverse direction and inserted back into the positive electrode.

A battery using lithium metal for the negative electrode encounters the problem of short-circuits in the battery caused by the repetition of the charge/discharge cycles. Repetition of charge/discharge cycles leads to a repetition of the dissolution and precipitation of lithium metal, and dendrites of lithium metal can grow on the surface of the negative electrode. The dendrite grows penetrating through the separator between the negative and the positive electrode, and comes into contact with the positive electrode, resulting in a short-circuit.

Use of a lithium metal alloy, e.g. Li—Al, for the negative electrode instead of lithium metal decreases such growth of dendrites, and improves the charge/discharge cycle characteristic.

A more advanced and safer approach to lithium rechargeable batteries consists of replacing a lithium metal or alloy-type negative electrode by a lithium intercalating compound. When another lithium intercalating compound is used as a positive electrode, this leads to a lithium metal-free rechargeable battery; such a battery is called a Li-ion battery. During charging, lithium ions deintercalate from the positive electrode, and move into the non-aqueous electrolyte. Then the negative electrode intercalates these ions. During discharging the process is reversed. Both electrodes exhibit the so-called intercalation reaction, also known as the host-guest reaction. It does not involve an electrolyte concentration change, nor any dissolution of the active materials into the electrolyte. Therefore, Li-ion batteries sometimes bear the name "rocking-chair batteries". Carbon materials are good hosts for use as a negative electrode, because they are able to intercalate and deintercalate lithium ions during charging and discharging, respectively, of the battery. In such a negative electrode of carbon the growth of dendrites is prevented, and the problem of a short-circuit in the battery is solved.

In more recent years a new rechargeable lithium battery has been developed which is based on laminates. These very thin and flexible lithium-ion polymer batteries meet the demand for thin batteries of flexible shape for the portable equipment market. Because of the flexibility, it is possible in principle to fold the battery into any desired shape; the battery design is no longer limited to cylindrical or prismatic shape. However, as batteries get thinner, application of external pressure, which is needed to maintain good contact between the electrodes and the electrolyte, becomes difficult. In order to solve this problem, polymer binder is mixed with the electrode materials to produce flexible sheets of negative and positive electrodes. The material for the porous separator is chosen from the same polymer. The sheets servings as the negative electrode, separator, and positive electrode, all of polymeric composition, are laminated together by applying heat and pressure to form a single sheet of battery material. In order to activate the battery, the permeable laminate is immersed in an electrolyte salt solution.

A lithium secondary battery of the type mentioned in the opening paragraph is known from United States patent U.S. Pat. No. 5,478,668. The known battery is a unitary planar laminated structure comprising a polymeric anode layer, a polymeric cathode layer and a polymeric separator layer. In a preferred embodiment, the polymer in the three layers is the same, e.g. a copolymer of vinylidene fluoride and hexafluoropropylene. Lamination of the layers is carried out by applying heat and pressure. The polymer in the layers also comprises a plasticizer, which is extracted by a solvent. The laminate thus treated is then activated by penetration of an electrolyte solution. The use of the same (co)polymer in the three layers ensures a good adhesion, and therefore a good contact, between these layers. The battery obtained is composed of one continuous polymeric phase in which in the electrode regions the active electrode materials are homogeneously dispersed.

BRIEF SUMMARY OF THE INVENTION

It is an object of the invention to provide, inter alia, a lithium secondary battery which can be produced in a thin and flexible form, and in which the contact between the electrodes and the electrolyte is maintained in an alternative way. Moreover, it is an object of the invention to provide a method of manufacturing such a battery.

These objects are achieved in a battery as specified in the opening paragraph, characterized in that the negative electrode material and the positive electrode material are provided with a pattern of holes, the holes being filled with a polymeric material which sticks and presses the negative electrode, the positive electrode and the separator contiguously together. The holes in the electrode materials are macroscopic holes having a diameter of e.g. 1 mm. In a typical example, the pattern of the holes forms a rectangular two-dimensional array with a mutual hole distance of 5 mm. The holes, at least those facing the separator, are filled with polymeric material, which contacts the separator. The dimensions of the holes and the pattern are chosen in such a way that the active surface of the electrodes amounts preferably to at least 90%, because the holes filled with polymeric material reduces the capacity of the electrodes: in these filled holes the active electrode material is absent. In this embodiment, the bottom of the holes is formed by the current collector. The current collector is necessary for collecting current from the electrode material. Usually, the current collector is a metal foil or metal mesh onto which the electrode material is applied. The polymeric material in each of the holes acts as a plug, and sticks to the separator, the electrode material and the current collector, causing these parts to be bonded together. For this reason, the selected polymeric material must be compatible with the materials of these parts. The polymeric material may be an adhesive, or a meltable polymer having a melting point below that of the material of the separator.

A particular embodiment of the battery is characterized in that the current collectors are provided with a pattern of holes substantially overlapping the holes in the electrode materials, and that the holes of both patterns are filled with the polymeric material. The holes in the electrode materials coincide with the holes in the current collectors. A polymeric material can be introduced from the side of the electrodes opposite the separator, e.g. by melting a polymeric foil and pressing it onto the electrodes. The melting polymer penetrates the holes, solidifies and forms a continuous plug.

A preferential embodiment of the battery is characterized in that the separator is provided with a pattern of holes substantially overlapping the holes in the electrode materials, and that the holes of all patterns are filled with the polymeric material. The holes in the electrode materials and the current collectors coincide with the holes in the separator. The polymeric material introduced into the holes forms a kind of rivets, which bond together the electrodes and the separator.

The battery according to the invention is a laminate of both electrodes and the separator, forming a layered cell structure.

The holes in the electrode material and the current collector can be made by punching or laser cutting. The electrode material can also be directly provided with holes by means of a suitable application method, e.g. by means of patternwise screen printing a paste comprising the electrode active material onto the current collector.

Convenient methods of manufacturing the above-mentioned batteries will be elucidated hereunder.

The negative electrode (also called anode) in a rechargeable battery according to the present invention basically comprises negative electrode active material for the battery reaction and a negative current collector serving to transmit electrons upon charging and discharging.

The negative electrode material is an intercalatable material, preferably carbon, such as amorphous carbon or graphite, dispersed in a polymeric binder matrix. Lithium can be intercalated between crystal layers of carbon in a quantity of maximally 1 lithium atom per 6 carbon atoms, in other words $LiC_6$ at most.

The positive electrode (also called cathode) comprises positive electrode active material and a positive current collector.

The positive electrode material is a lithium intercalation compound, such as $LiMn_2O_4$, $LiCoO_2$ or $LiNiO_2$ dispersed in a polymeric binder matrix. The mixture also comprises a powdery conductive material, such as carbon black (acetylene black, thermal black for example), graphite powder, metal powder or the like. The amount of conductive material is in the range of 2 to 15% by weight.

For the binder matrix polymers are used, which include polysaccharide, thermoplastic polymers and polymers having rubber-like elasticity. Examples include carboxymethyl cellulose, polytetrafluoroethylene, polyethylene, polypropylene and styrene-butadiene rubber. The polymers may be used singly or in combination. The polymeric binder serves to bind together active material powders to prevent cracks and fix such powdery materials to the surface of the current collector. The amount of the polymeric binder is in the range of 2 to 30% by weight.

For the current collector use can be made of any electronic conductor provided that it does not induce chemical reactions in the battery. Examples of materials for the positive current collector (cathode) include stainless steel, aluminium and nickel. Examples of materials for the negative current collector (anode) include stainless steel, copper and nickel. The collector may be in the shape of a foil, film or sheet, and may be porous, punched or mesh-like. The thickness of the collector generally is in the range of 1 to 500 μm.

The separator provided between the positive and negative electrode is an insulated film having both high ion permeability and desired mechanical strength. It prevents short-circuits between the negative and the positive electrode, and holds the electrolytic solution. A generally used separator is made of glass fibre, or a porous sheet or non-woven fabric made of olefinic polymers such as polyethylene or polypropylene. The diameter of the pores generally is in the range of 0.01 to 10 μm. The thickness of the separator generally is in the range of 5 to 300 μm.

The battery structure of the present invention may be activated with any of the numerous compositions used as liquid electrolyte solutions. For the solvent an ester, such as ethylene carbonate, propylene carbonate, methylethylcarbonate; an ether, such as tetrahydrofurane; dimethyl sulfoxide, and mixtures thereof may be used. Examples of the solute include salts composed of lithium ions ($Li^+$) and Lewis acid ions ($BF_4^-$, $PF_6^-$, $AsF_6^-$, $ClO_4^-$, $CF_3SO_3^-$) and mixed salts thereof. The concentration of the salt is between 0.5 and 2 mol/l.

The battery according to the invention may be in the form of a flat flexible sheet-like product or it may be folded in zig-zag fashion, or wound into a cylindrical or rectangular prismatic shape. The battery may be of the single-layer or multi-layer type. The flat battery structure may be die-punched into coins for use in the familiar button batteries.

Batteries of various size, capacity, and voltage range can be obtained from the layered cell structure by overlaying a number of cells or manifolding a single cell of extended dimension. Batteries of higher capacity can be constructed by repeating the sequences of cell elements. The voltage output of a battery may be increased by series multiplexing of a plurality of the basic laminate of the layered cell structure; in that case, the negative electrode layer of the first cell structure is placed in electrical contact with the positive electrode layer of a second similar cell structure. In these embodiments the battery comprises a multilayer stack of layers of a negative electrode, a separator and a positive electrode.

The battery is enclosed in a battery case, which may be a plastic metallic or a plastic resin case. Examples of these materials include stainless steel and plastics like polypropylene. The sealing may be made by an adhesive, welding or soldering. A flat flexible battery may be enclosed in an air and moisture-proof bag of polymer-coated aluminium foil. Sheets of such foil are commercially available, and can be sealed together at their edges. The sheets typically comprise an outer 15 μm polyester or polyethylene film, a 50 μm aluminium foil, and an inner 15 μm polyester or polyethylene film, bearing a 90 μm layer of heat sealing adhesive.

If desired, the battery according to the invention may be provided with a layer, behind the negative electrode and facing away from the separator, having a spring function. This layer may be useful if the negative electrode material undergoes a large volume change due to charging and discharging, e.g. if the negative electrode material is lithium metal. The layer will compensate for the change in volume. This layer having a spring function is made of a resilient material and is e.g. an elastic foam, such as polyurethane or crosslinked polyolefin. During discharging, the negative electrode gets thinner and the foam layer expands to maintain the pressure. Upon charging, lithium is deposited and the volume of the negative electrode expands, while compressing the foam layer.

The object to provide a method of manufacturing a lithium secondary battery is achieved by a method as specified in the opening paragraph, characterized in that the method comprises the following steps:

a) a pattern of holes is made through the negative electrode;
b) a pattern of holes is made through the positive electrode, the pattern being the same as in a);
c) a pattern of holes is made in the separator, the pattern being the same as in a);
d) the holes of the patterns under a), b) and c) in the stack are aligned to form overlapping holes;
e) a polymer film is made having a pattern of piles on at least one of its surfaces, the pattern corresponding to the patterns of a), b), and c); the length of the piles being at least equal to the thickness of the stack;
f) the stack is placed on the polymer film, so that the piles penetrate through the holes and project beyond the stack;
g) the stack and the polymer film are subjected to heat and pressure to flatten out the projected piles so as to form a laminate structure of the polymer film, the negative electrode, the separator and the positive electrode.

In this method, and in the methods mentioned below, patterns of holes are made in the electrodes, i.e. through the electrode materials and the current collectors, by techniques such as mechanical punching or laser cutting. The holes are macroscopic holes having a diameter of e.g. 1 mm. In a typical example, the pattern of the holes forms a rectangular two-dimensional array with a mutual hole distance of 5 mm. Also the separator is provided with holes of the same pattern and dimensions. The patterns of the electrodes and the separator are aligned so that the holes overlap. The stack comprising a negative electrode, a separator and a positive electrode is placed on a structured polymer film. The structure of the polymer film consists of a pattern of piles, corresponding to the pattern of the holes. The piles will penetrate the holes, and project beyond the stack. The ends of the piles are then subjected to heat and pressure to flatten out the projected piles. After cooling, the piles introduced into the holes form a kind of rivets, which bond together the electrodes and the separator under pressure. In this way, a good contact is ensured between the electrodes and the separator, which will comprise the electrolyte.

An alternative embodiment of the method according to the invention is achieved by a method as specified in the opening paragraph, characterized in that the method comprises the following steps:

a) a pattern of holes is made in the negative electrode;
b) a pattern of holes is made in the positive electrode;
c) a film of a polymeric material is applied onto both sides of the stack, the polymeric material having a lower melting temperature than the material of the separator;
d) the stack and the polymer films are subjected to heat and pressure to melt the polymer films, so that the polymeric material penetrates the holes and contacts the separator to form a laminate structure of the polymer films, the negative electrode, the separator and the positive electrode.

In this method the stack of the negative electrode, the separator, and the positive electrode, is placed between two films of polymeric material. After applying heat and pressure to this stack, the polymeric material melts and penetrates into the holes in the electrodes. The polymeric material will stick to the separator. It is important to use a polymeric material which has a lower melting point than the material of the separator.

A further refinement of the last-mentioned method is characterized in that in step b) the pattern of holes in the positive electrode is made so as to be the same as in a), and that before step c) the separator is provided with a pattern of holes, the pattern being the same as in a). Although not necessary, the holes are preferably aligned so that they overlap. After applying heat and pressure, the polymeric material of the two polymer films melts and penetrates into the holes of the electrodes and the separator. In the aligned mode, the polymeric material introduced into the holes will form a kind of rivets, which bond together the electrodes and the separator under pressure.

Another alternative embodiment of the method according to the invention is achieved by a method as specified in the opening paragraph, characterized in that the method comprises the following steps:

a) a pattern of holes is made through the negative electrode;
b) a pattern of holes is made through the positive electrode;
c) the separator is made of a polymeric material;
d) the stack is subjected to heat and pressure, causing a part of the polymeric material to penetrate into the holes, thereby bounding together the electrodes and the separator.

In this method the separator is made of a polymeric material. After applying heat and pressure, the polymeric material melts and penetrates into the holes in the electrodes. In this way also a multi battery stack can be made which is held together by separators. An example of such a polymeric material is polyethylene filled with inorganic particles, such as silica or alumina.

In the above mentioned methods, use is preferably made of porous polymeric material for the polymer films and the separator through which ions are movable, e.g. porous polyethylene. Preferably, the polymeric material is elastic.

The electrode materials can be made by mixing negative or positive active material, conductive material, and binder material, which are all in the form of powder, in a dry process, or in a wet process in which water or an organic solvent is further added. Materials which can be used are mentioned above.

The paste-like mixture obtained is then coated onto the current collector, dried and compressed. For this purpose, one of the following coating methods can be generally employed: screen printing, roller coating, doctor blade coating, knife coating, extrusion coating, bar coating, dip coating and squeeze coating. The thickness of the coated layer, which is compressed after drying, generally is in the range of 1 to 1000 $\mu$m.

Pressing of the stack in the above mentioned methods is accomplished by simply pressing it for a short period of time between metal plates at a pressure of about $5.10^4$ Pa in an oven at about 110? to 150?C. The operation may also be carried out using calender rollers. After heating, the stack is cooled down to room temperature. Heating and cooling down may also be carried out in a mould with a particular shape, e.g. the shape of the appliance into which the battery should be fitted.

BRIEF SUMMARY OF THE INVENTION

In the same way as described above, a multilayer stack of layers can be bonded together in one step, thereby obtaining a battery of increased capacity or voltage.

The non-aqueous secondary battery of the invention can be used in various (cordless) applications, for example, notebook personal computers, portable CD-players, portable telephones, paging equipment, video cameras, electric shavers, electric tools, and hearing aids.

The invention will be elucidated in greater detail by means of an exemplary embodiment and with reference to the accompanying drawings,

DETAILED DESCRIPTION OF THE INVENTION

Exemplary Embodiment.

A mixture for the negative electrode material is prepared by mixing 6 g graphite particles having a particle size of 10 $\mu$m as the active positive material, 4.5 g carboxymethyl cellulose (1% aqueous solution) and 0.5 g styrene butadiene rubber (60% dispersion in water) as a binder, and formed into a paste to be applied as a coating onto both surfaces of a copper foil current collector. The thickness of the coating is 200 $\mu$m. The thickness of the copper foil amounts to 14 $\mu$m. The pasted current collector is pre-dried at 85° C. for 15 minutes, heat-treated at 110° C. for 3 hours and then pressed until the thickness becomes 110 $\mu$m. The positive electrode is cut out so as to be a square of 2×2 cm$^2$.

A mixture for the positive electrode material is prepared by mixing 6 g LiCoO$_2$ as the active positive material, 0.18 g acetylene black as a conductive material, 5 g carboxymethyl cellulose (1% aqueous solution) and 0.7 g polytetrafluoroethylene (60% dispersion in water) as a binder, and formed into a paste to be applied as a coating onto both surfaces of an aluminium foil current collector. The thickness of the coating is 420 $\mu$m. The thickness of the aluminium foil amounts to 20 $\mu$m. The pasted current collector is pre-dried at 85° C. for 15 minutes, heat-treated at 250° C. for 4 hours and then pressed until the thickness becomes 100 $\mu$m. The negative electrode is cut out so as to be a square of 2×cm$^2$.

A 25 $\mu$m thick porous polyethylene foil is used as a separator.

The negative electrode, the positive electrode, and the separator are all provided with a pattern of holes by mechanical punching. The diameter of the holes is 1 mm. The holes are provided in a two-dimensional array with a mutual hole distance of 5 mm.

Figure 1A:
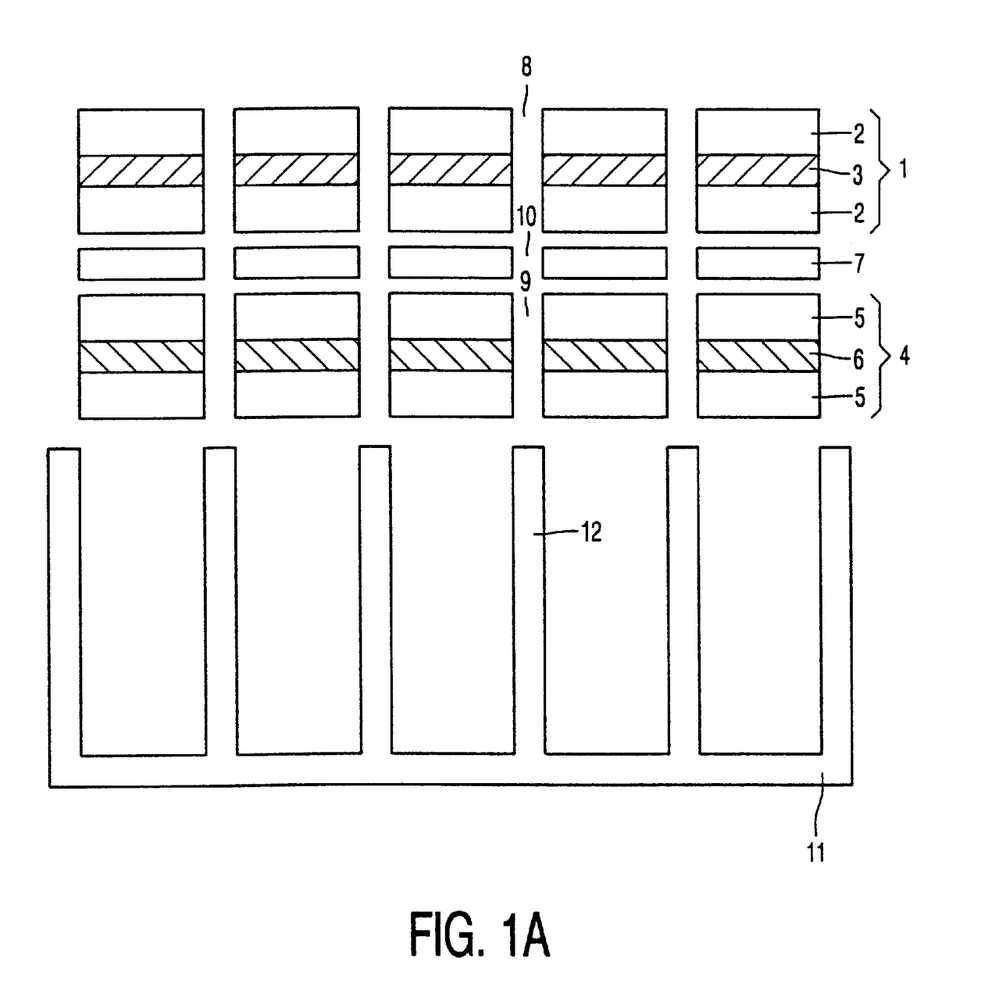
FIG. 1A shows a schematic cross-sectional view of an initial method step in the manufacture of a battery in accordance with the invention.
Figure 1B:
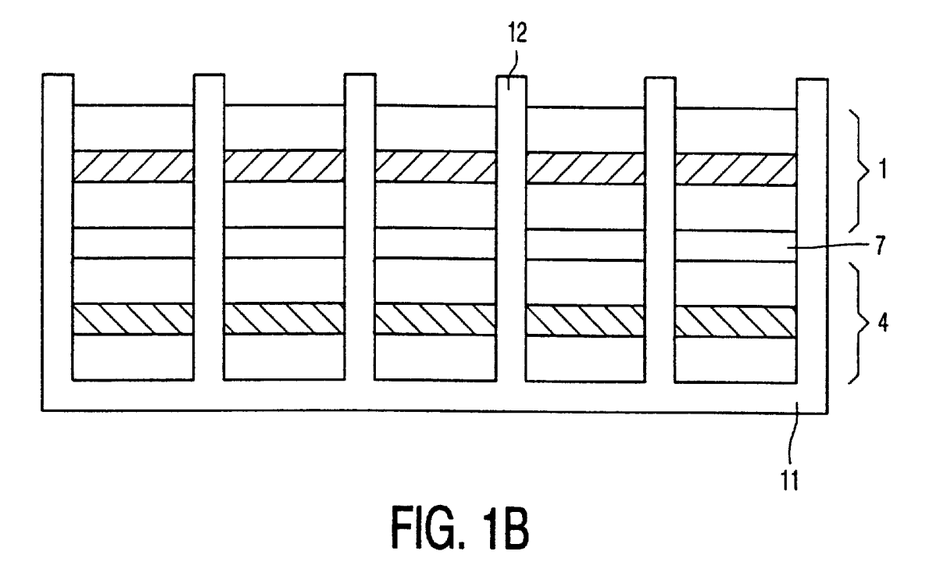
FIG. 1B shows a schematic cross-sectional view of a second method step in the manufacture of a battery in accordance with the invention.
Figure 1C:
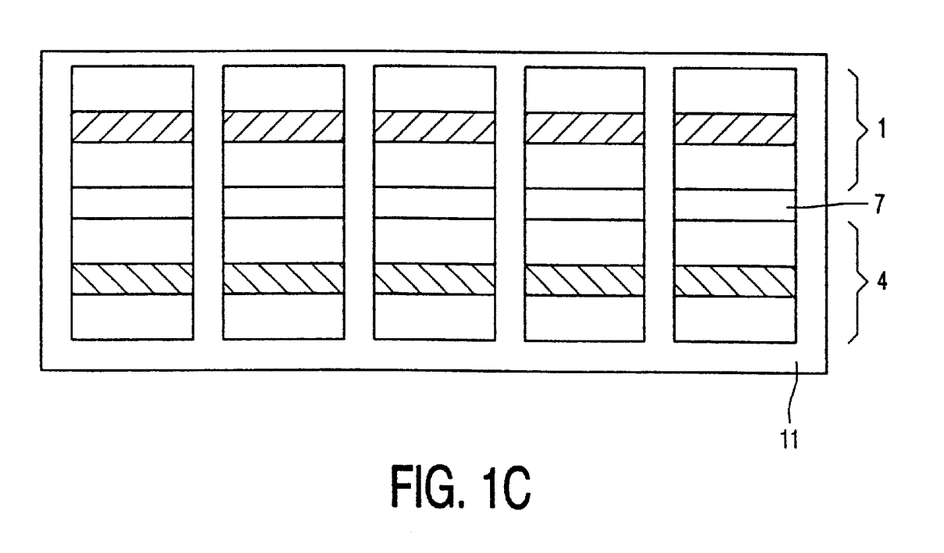
FIG. 1C shows a schematic cross-sectional view of a third method step in the manufacture of a battery in accordance with the invention.

The FIGS. 1A to 1C schematically show a number of method steps in the manufacture of a lithium secondary battery in accordance with the invention. The electrode materials are prepared as indicated above. The dimensions are not drawn to scale.

FIG. 1A shows the negative electrode 1 comprising the negative electrode material 2 on both sides of the copper current collector 3. A positive electrode 4 comprises positive electrode material 5 on both sides of the aluminium current collector 6. The separator 7 is placed between both electrodes 1 and 4. The negative electrode comprises holes 8, the positive electrode comprises holes 9, and the separator comprises holes 10. The electrodes 1 and 4, and the separator 7 are stacked in such a manner that the patterns of the holes 8,9,10 are aligned so that the holes overlap.

The aligned stack is placed on a structured microporous polyethylene film 11 having piles 12. The piles 12 have the same pattern as the holes 8,9,10 and just fit in these holes. The piles 12 penetrate the holes 8,9,10 and project beyond the stack (FIG. 1B).

The stack is heated between two metal plates at a pressure of $5.10^4$ Pa and 130?C for 5 seconds. By this operation, the projecting piles 12 are flattened (FIG. 1C), and a self-supporting battery stack with a surface area of 4 cm$^2$ is produced.

The battery is immersed in an electrolyte containing 1.5 mol/l $LiPF_6$ in a mixture of ethylene carbonate and methylethylcarbonate (1:3).

The battery containing the electrolyte is packaged in a bag consisting of polyethylene-coated aluminium foil and sealed.

Figure 2:
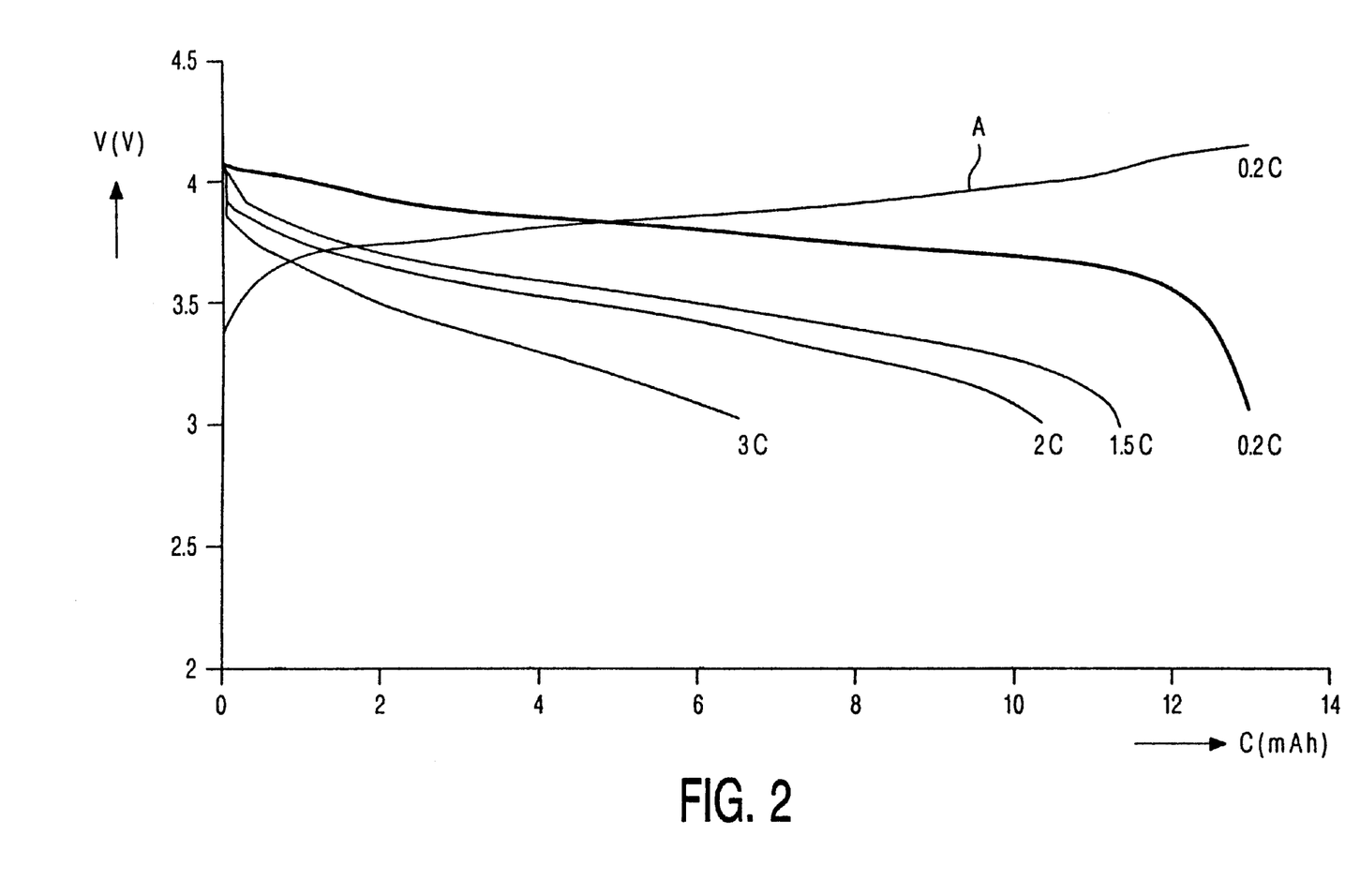
FIG. 2 shows the battery voltage V (in Volts) versus discharged capacity C (in mAh) for charging at a 0.2 C rate at different discharging rates.

The battery is charged at a 0.2 C rate, wherein C is the battery capacity in mAh. FIG. 2 shows the relationship between the battery voltage V and the capacity C in Mah. In this Figure, curve A represents the battery voltage V during charging at a 0.2 C rate. FIG. 2 also shows the discharge curves at various discharge rates: 0.2 C, 1.5 C, 2 C and 3 C. The capacity of the battery decreases with increasing discharge rate. However, at a discharge rate of 2 C the battery can still be discharged to almost 80% of its capacity.

Figure 3:
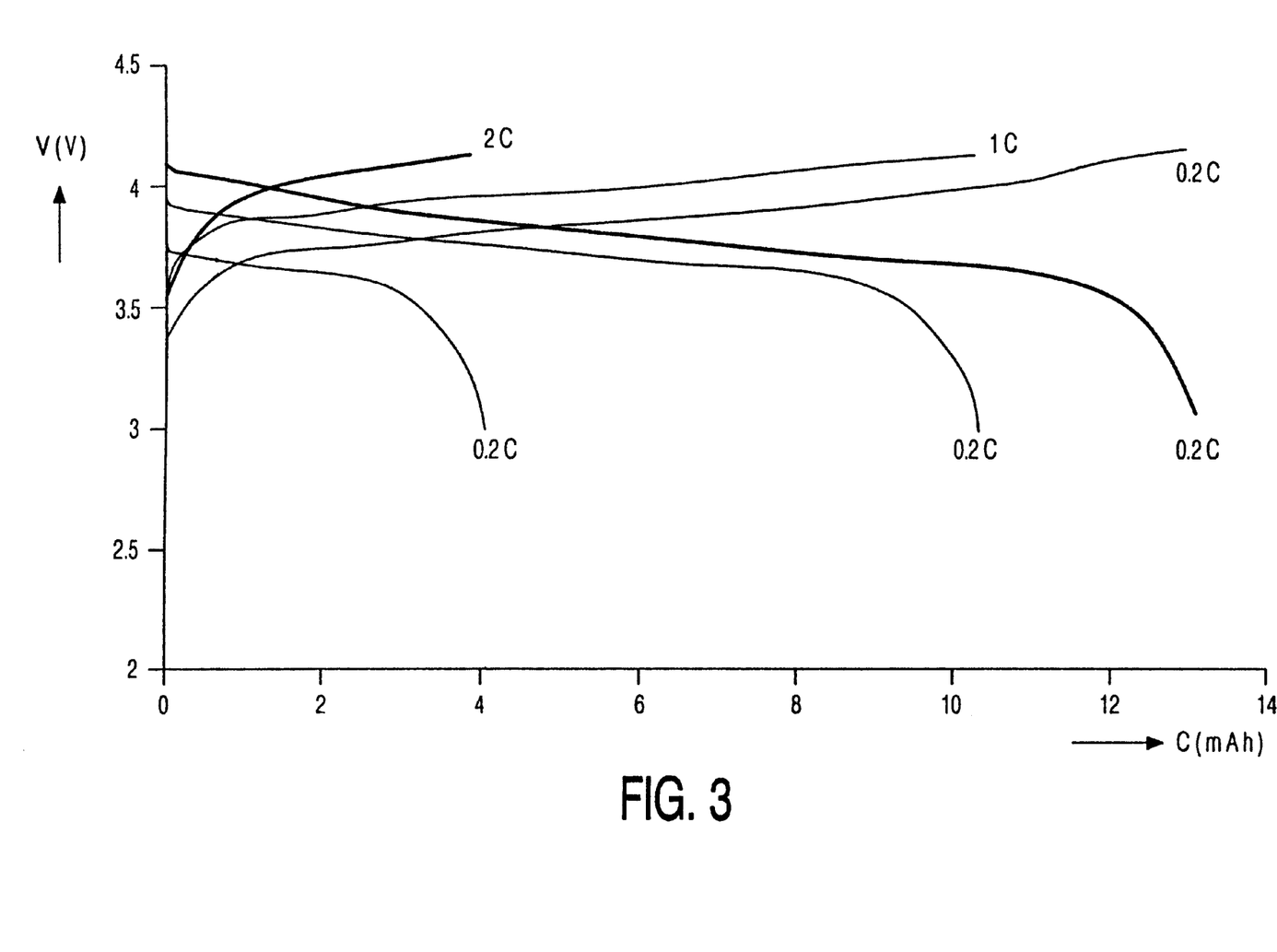
FIG. 3 shows the battery voltage V (in Volts) versus charged capacity C (in mAh) for discharging at a 0.2 C rate at different charging rates.

The influence of the rate of charging on the capacity of the battery is shown in FIG. 3. Here, the battery is charged at rates of 0.2 C, 1 C and 2 C (ascending curves), and discharged at 0.2 C rate (descending curves) to determine the charge capacity.

The results shown in FIGS. 4 and 5 are very comparable with commercial Li-ion cells, where a pressure between electrode and electrolyte is applied by the casing of the battery.

According to the invention a lithium secondary battery is provided, which may be made so as to be flexible and thin, and in which a good contact between the electrodes and the electrolyte is ensured. The invention also provides a number of simple methods for manufacturing such a battery.

What is claimed is:

1. A lithium secondary battery comprising a stack of:
a negative electrode having negative electrode material and a negative current collector,
a positive electrode having positive electrode material and a positive current collector
a separator sandwiched between the negative and the positive electrodes,
a non-aqueous electrolyte solution between the negative and the positive electrode, wherein the negative electrode material and the positive electrode material are provided with a pattern of holes, a film of a polymeric material is provided on at least one surface of the stack or the separator and is made of a polymeric material, the holes being filled with the polymeric material of the film or of the separator, which polymeric material sticks to and presses the negative electrode, the positive electrode and the separator contiguously together.

2. A lithium secondary battery as claimed in claim 1, characterized in that the current collectors are provided with a pattern of holes substantially overlapping the holes in the electrode materials, and that the holes of both patterns are filled with the polymeric material.

3. A lithium secondary battery as claimed in claim 1 or 2, characterized in that the separator is provided with a pattern of holes substantially overlapping the holes in the electrode materials, and that the holes of all patterns are filled with the polymeric material.

4. A lithium secondary battery as claimed in claim 1, characterized in that the polymeric material is an adhesive.

5. A lithium secondary battery as claimed in claim 1, characterized in that the polymeric material is polyethylene.

6. A lithium secondary battery as claimed in claim 1, characterized in that the battery comprises a multilayer stack of layers of a negative electrode, a separator and a positive electrode.

7. A lithium secondary battery as claimed in claim 1, wherein a surface of the negative electrode facing away from the separator is provided with a resilient foam layer and a film of a polymeric material is provided on a surface of the positive electrode facing away from the separator.

8. A method of manufacturing a lithium secondary battery comprising a stack of a negative electrode, a separator, and a positive electrode, which method comprises applying negative electrode material onto a negative current collector so as to form the negative electrode, applying positive electrode material onto a positive current collector so as to form the positive electrode, arranging a separator between the negative and the positive electrode so as to be contiguous therewith, and providing a non-aqueous electrolyte solution between the negative and the positive electrodes, characterized in that the method comprises the following steps:
a) a pattern of holes is made through the negative electrode;
b) a pattern of holes is made through the positive electrode, the pattern being the same as in a);
c) a pattern of holes is made in the separator, the pattern being the same as in a);
d) the holes of the patterns under a), b) and c) in the stack are aligned to form overlapping holes;
e) a polymer film is made having a pattern of piles on at least one of its surfaces, the pattern corresponding to the patterns of a), b), and c); the length of the piles being at least equal to the thickness of the stack;
f) the stack is placed on the polymer film, so that the piles penetrate through the holes and project beyond the stack;
g) the stack and the polymer film are subjected to heat and pressure to flatten out the projected piles so as to form a laminate structure of the polymer film, the negative electrode, the separator and the positive electrode.

9. A method of manufacturing a lithium secondary battery comprising a stack of a negative electrode, a separator and a positive electrode, which method comprises applying negative electrode material onto a negative current collector so as to form the negative electrode, applying positive electrode material onto a positive current collector so as to form the positive electrode, arranging the separator between the negative and the positive electrode so as to be contiguous therewith, and providing a non-aqueous electrolyte solution between the negative and the positive electrolyte, characterized in that the method comprises the following steps:

a) a pattern of holes is made in the negative electrode;

b) a pattern of holes is made in the positive electrode;

c) a film of a polymeric material is applied onto both sides of the stack, the polymeric material having a lower melting temperature than the material of the separator;

d) the stack and the polymer films are subjected to heat and pressure to melt the polymer films, so that the polymeric material penetrates the holes and contacts the separator to form a laminate structure of the polymer films, the negative electrode, the separator and the positive electrode.

10. A method as claimed in claim 7, characterized in that in step b) the pattern of holes in the positive electrode is made so as to be the same as in a), and before step c) the separator is provided with a pattern of holes, the pattern being the same as in a).

11. A method of manufacturing a lithium secondary battery comprising a stack of a negative electrode, a separator, and a positive electrode, which method comprises applying negative electrode material onto a negative current collector so as to form the negative electrode, applying positive electrode material onto a positive current collector so as to form the positive electrode, arranging a separator between the negative and the positive electrode so as to be contiguous therewith, and providing a non-aqueous electrolyte solution between the negative and the positive electrolyte, characterized in that the method comprises the following steps:

a) a pattern of holes is made through the negative electrode;

b) a pattern of holes is made through the positive electrode;

c) the separator is made of a polymeric material;

d) the stack is subjected to heat and pressure, causing a part of the polymeric material to penetrate into the holes, thereby bounding together the electrodes and the separator.

* * * * *